US012756026B2

(12) United States Patent
Kim et al.

(10) Patent No.: US 12,756,026 B2
(45) **Date of Patent: *Oct. 6, 2026**

(54) METHOD FOR RECOVERING ACTIVE MATERIAL USING POSITIVE ELECTRODE SCRAP

(71) Applicant: LG ENERGY SOLUTION, LTD., Seoul (KR)

(72) Inventors: Min-Seo Kim, Daejeon (KR); Se-Ho Park, Daejeon (KR); Doo-Kyung Yang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 66 days.

This patent is subject to a terminal disclaimer.

(21) Appl. No.: 17/799,185

(22) PCT Filed: Jan. 15, 2021

(86) PCT No.: PCT/KR2021/000617

§ 371 (c)(1),
(2) Date: Aug. 11, 2022

(87) PCT Pub. No.: WO2021/241835

PCT Pub. Date: Dec. 2, 2021

(65) Prior Publication Data

US 2023/0082541 A1 Mar. 16, 2023

(30) Foreign Application Priority Data

May 25, 2020 (KR) ........................ 10-2020-0062371

(51) Int. Cl.
*H01M 10/54* (2006.01)
*C01G 53/502* (2025.01)
(Continued)

(52) U.S. Cl.
CPC .......... *H01M 10/54* (2013.01); *C01G 53/502* (2025.01); *C01G 53/504* (2025.01);
(Continued)

(58) Field of Classification Search
CPC ........ H01M 10/54; H01M 4/131; H01M 4/36; H01M 4/505; H01M 4/525; H01M 4/62
(Continued)

(56) References Cited

U.S. PATENT DOCUMENTS 5,972,531 A * 10/1999 Kawakami ............ H01M 10/54 429/49
6,261,712 B1 * 7/2001 Hayashi ................ H01M 10/54 429/231.95
(Continued)

FOREIGN PATENT DOCUMENTS

CN 101336496 A 12/2008
CN 103915661 * 7/2014
(Continued)

OTHER PUBLICATIONS

International Search Report from PCT/KR2021/000617, dated, Apr. 27, 2021.
(Continued)

*Primary Examiner* — Brian K Talbot
(74) *Attorney, Agent, or Firm* — Bryan Cave Leighton Paisner LLP

(57) ABSTRACT

There is provided a method for collecting and reusing an active material from positive electrode scrap. The method of reusing a positive electrode active material of the present disclosure includes (a) thermally treating a positive electrode scrap comprising an active material layer comprising nickel, cobalt and manganese on a current collector in air for thermal decomposition of a binder and a conductive material in the active material layer, to separate the current collector
(Continued)

from the active material layer, and collecting an active material in the active material layer, (b) washing the active material collected form the step (a) with a lithium compound solution which is basic in an aqueous solution and drying, and (c) annealing the active material washed from the step (b) with an addition of a lithium precursor to obtain a reusable active material.

16 Claims, 7 Drawing Sheets

(51) Int. Cl.

| | |
|---|---|
| ***C01G 53/504*** | (2025.01) |
| ***C01G 53/506*** | (2025.01) |
| *H01M 4/131* | (2010.01) |
| *H01M 4/36* | (2006.01) |
| *H01M 4/505* | (2010.01) |
| *H01M 4/525* | (2010.01) |
| *H01M 4/62* | (2006.01) |

(52) U.S. Cl.

CPC ........ *C01G 53/506* (2025.01); *C01P 2002/52* (2013.01); *C01P 2004/03* (2013.01); *C01P 2004/80* (2013.01); *C01P 2006/40* (2013.01); *H01M 4/131* (2013.01); *H01M 4/36* (2013.01); *H01M 4/505* (2013.01); *H01M 4/525* (2013.01); *H01M 4/62* (2013.01)

(58) Field of Classification Search

USPC .......................................................... 427/122

See application file for complete search history.

(56) References Cited

U.S. PATENT DOCUMENTS

| | | | | |
|---|---|---|---|---|
| 8,616,475 | B1 * | 12/2013 | Smith | H01M 10/54 241/23 |
| 8,846,225 | B2 | 9/2014 | Sloop | |
| 9,825,341 | B2 * | 11/2017 | Sloop | H01M 10/54 |
| 10,411,310 | B2 * | 9/2019 | Chiang | H01M 6/52 |
| 11,031,632 | B2 * | 6/2021 | Lee | H01M 10/54 |
| 12,218,323 | B2 * | 2/2025 | Park | H01M 10/54 |
| 2009/0229413 | A1 | 9/2009 | Kakuta et al. | |
| 2009/0272939 | A1 | 11/2009 | Sun et al. | |
| 2013/0266855 | A1 | 10/2013 | Kim et al. | |
| 2014/0056797 | A1 | 2/2014 | Kabe et al. | |
| 2014/0306162 | A1 * | 10/2014 | Poe | H01M 4/587 252/506 |
| 2016/0043383 | A1 * | 2/2016 | Hamada | H01M 4/049 252/182.1 |
| 2016/0251740 | A1 * | 9/2016 | Bi | B22F 9/04 75/353 |
| 2016/0372802 | A1 | 12/2016 | Chiang et al. | |
| 2017/0200989 | A1 * | 7/2017 | Sloop | H01M 4/131 |
| 2018/0212282 | A1 * | 7/2018 | Lee | C22B 7/001 |
| 2022/0393146 | A1 * | 12/2022 | Amouzegar | H01M 4/1391 |
| 2023/0045467 | A1 * | 2/2023 | Park | H01M 4/525 |
| 2023/0063543 | A1 * | 3/2023 | Kim | H01M 4/0471 |
| 2023/0107938 | A1 * | 4/2023 | Nishikawa | C22B 7/007 75/10.67 |
| 2023/0183836 | A1 * | 6/2023 | Kim | C22B 7/001 423/179.5 |
| 2023/0238598 | A1 * | 7/2023 | Kim | C22B 7/001 252/182.1 |
| 2024/0047775 | A1 * | 2/2024 | Lipson | C22B 1/02 |
| 2024/0055597 | A1 * | 2/2024 | Lee | H01M 4/505 |
| 2024/0120566 | A1 * | 4/2024 | Kim | C01G 53/50 |
| 2025/0033993 | A1 * | 1/2025 | Seo | H01M 10/052 |

FOREIGN PATENT DOCUMENTS

| | | | | | |
|---|---|---|---|---|---|
| CN | 103915661 | A | | 7/2014 | |
| CN | 105190963 | A | | 12/2015 | |
| CN | 105895854 | A | | 8/2016 | |
| CN | 105990617 | A | * | 10/2016 | B22F 1/00 |
| CN | 106450547 | | * | 2/2017 | |
| CN | 106450547 | A | | 2/2017 | |
| CN | 108172922 | A | | 6/2018 | |
| CN | 110842006 | | * | 2/2020 | |
| CN | 110842006 | A | | 2/2020 | |
| JP | H0822846 | A | * | 1/1996 | H01M 10/54 |
| JP | 3495707 | B2 | * | 2/2004 | C22B 7/005 |
| JP | 4491085 | B2 | | 6/2010 | |
| JP | 2012-195073 | A | | 10/2012 | |
| JP | 2016-149330 | A | | 8/2016 | |
| JP | 6055761 | B2 | | 12/2016 | |
| JP | 6530640 | B2 | | 6/2019 | |
| KR | 10-2000-0019850 | A | | 4/2000 | |
| KR | 10-1328585 | B1 | | 11/2013 | |
| KR | 10-2017-0033787 | A | | 3/2017 | |
| KR | 2017-0075124 | A | | 7/2017 | |
| KR | 10-1992715 | B1 | | 6/2019 | |
| WO | WO-2019199015 | A1 | * | 10/2019 | C01D 15/02 |

OTHER PUBLICATIONS

Written Opinion of the ISA from PCT/KR2021/00617, dated Apr. 27, 2021.

Sieber et al. (2019) "Recovery of Li(Ni0.33Mn0.33Co0.33)O2 from Lithium-Ion Battery Cathodes: Aspects of Degradation", Nanomaterials, vol. 9, No. 2, 246, 14 pages, no month available.

Li et al. (2018) "Regenerating of LiNi0.5Co0.2Mn0.3O2 cathode materials from spent lithium-ion batteries", Journal of Materials Science: Materials in Electronics, vol. 29, No. 2, pp. 17661-17669, no month available.

Zhao et al. (2019) "Regeneration and reutilization of cathode materials from spent lithium-ion batteries", Chemical Engineering Journal, vol. 383, 123089, 19 pages, no month available.

* cited by examiner

METHOD FOR RECOVERING ACTIVE MATERIAL USING POSITIVE ELECTRODE SCRAP

CROSS-REFERENCE TO RELATED APPLICATIONS

The present application is a National Phase entry pursuant to 35 U.S.C. § 371 of International Application No. PCT/KR2021/000617, filed on Jan. 15, 2021, and claims the benefit of and priority to Korean Patent Application No. 10-2020-0062371, filed on May 25, 2020 with the Korean Intellectual Property Office, the disclosures of which are incorporated herein by reference in their entirety for all purposes as if fully set forth herein.

TECHNICAL FIELD

The present disclosure relates to a method for reusing resources in the fabrication of a lithium secondary battery. More particularly, the present disclosure relates to a method for collecting and reusing positive electrode scrap generated in the lithium secondary battery fabrication process or positive electrode active materials of lithium secondary batteries discarded after use.

BACKGROUND

Lithium secondary batteries that can be recharged repeatedly are gaining attention as an alternative to fossil energy. They have been primarily used in traditional handheld devices such as mobile phones, video cameras and electric power tools. Recently, the range of applications tends to gradually extend to vehicles which are powered by electricity (EVs, HEVs, PHEVs), large-capacity energy storage systems (ESSs) and uninterruptible power systems (UPSs).

A lithium secondary battery includes an electrode assembly including unit cells, each unit cell including a positive electrode plate and a negative electrode plate including a current collector and an active material coated on the current collector with a separator interposed between the positive electrode plate and the negative electrode plate, and a packaging or a battery case in which the electrode assembly is hermetically received together with an electrolyte solution. The lithium secondary battery primarily includes lithium-based oxide as the positive electrode active material and a carbon-based material as the negative electrode active material. The lithium-based oxide contains a metal such as cobalt, nickel or manganese. In particular, cobalt, nickel and manganese are very expensive invaluable metals. Among them, cobalt is a strategic metal, and its supply is the focus of attention all over the world. Due to the limited number of cobalt producing countries, the global supply of cobalt is unstable. When a supply and demand imbalance of strategic metal occurs, there is a very high possibility that the cost of the raw material will rise.

Studies have been made to collect and recycle invaluable metals from lithium secondary batteries (waste batteries) discarded after the expiration date. In addition to waste batteries, resources may be more preferably collected from waste materials discarded after punching the positive electrode plate or the positive electrode in which defects or failures occurred during the process.

Currently, the lithium secondary battery is fabricated, as shown in FIG. 1, by coating a positive electrode slurry including a positive electrode active material, a conductive material, a binder and a solvent on a long sheet-type positive electrode current collector 10 such as an aluminum (Al) foil to form a positive electrode active material layer 20, manufacturing a positive electrode sheet 30, and punching a positive electrode plate 40 to a predetermined size. The leftover after punching is discarded as positive electrode scrap 50. If the positive electrode active material is collected and reused from the positive electrode scrap 50, it will be very desirable in the industrial-economic and environmental aspects.

Most of the existing methods of collecting the positive electrode active material include dissolving the positive electrode with hydrochloric acid, sulfuric acid, nitric acid or the like, extracting the active material elements such as cobalt, nickel and manganese and using them as raw materials for the positive electrode active material synthesis. However, the active material element extraction using acids uses a non-eco-friendly process to collect pure raw materials, and needs a neutralization process and a waste water treatment process, resulting in the increased process cost. Additionally, it is impossible to collect lithium, one of the key positive electrode active material elements. To overcome these disadvantages, there is a need for a direct reuse method that does not dissolve the positive electrode active material and does not extract the active material in the form of an element.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

The present disclosure is directed to providing a method for collecting and reusing active materials from positive electrode scrap.

Technical Solution

To achieve the above-described problem, a method of reusing a positive electrode active material of the present disclosure includes (a) thermally treating a positive electrode scrap comprising an active material layer on a current collector in air for thermal decomposition of a binder and a conductive material in the active material layer, to separate the current collector from the active material layer, and collecting an active material in the active material layer, (b) washing the active material collected from the step (a) with a lithium compound solution which is basic in an aqueous solution and drying, and (c) annealing the active material washed from the step (b) with an addition of a lithium precursor to obtain a reusable active material.

In the present disclosure, the positive electrode active material reuse method may further include (d) surface-coating the active material annealed from the step (c).

The thermal treatment may be performed at 300 to 650° C

The thermal treatment may be performed at 550° C for 30 min. at the temperature rise rate of 5° C/min.

The lithium compound solution contains a lithium compound, preferably LiOH, in an amount of more than 0% and 15% or less. The washing may be performed within 1 hour.

The washing may be performed by stirring the active material collected from the step (a) at the same time with immersing in the lithium compound solution.

The lithium precursor may be one or more selected from the group consisting of LiOH, $Li_2CO_3$, $LiNO_3$ and $Li_2O$.

The lithium precursor may be added in an amount for adding lithium at a ratio of lost lithium to a ratio between lithium and other metal in a raw active material used in the active material layer.

For example, the lithium precursor may be added in an amount corresponding to an amount of lithium at a molar ratio of 0.001 to 0.4 relative to an amount of lithium in the active material layer.

Further, an additional lithium precursor may be further added in an amount corresponding to an amount of lithium at a molar ratio of 0.0001 to 0.1 relative to an amount of lithium in the active material layer.

The annealing may be performed in air at 400 to 1000° C.

A temperature of the annealing step may exceed a melting point of the lithium precursor.

The active material in the active material layer may be collected in a form of powder, and carbon produced by carbonization of the binder or the conductive material may not remain on a surface of the powder.

The surface-coating step (d) may include coating at least one of a metal, an organic metal or a carbon material on a surface of the active material annealed from the step (c) by a solid or liquid phase process, and thermally treating at 100 to 1200° C.

The reusable active material may be represented by the following Formula 1:

$$Li_aNi_xMn_yCo_zM_wO_{2+\delta} \quad \text{[Formula 1]}$$

where M comprises at least one selected from the group consisting of B, W, Al, Ti and Mg, $1<a\leq1.1$, $0<x<0.95$, $0<y<0.8$, $0<z<1.0$, $0\leq w\leq0.1$, $-0.02\leq\delta\leq0.02$, $x+y+z+w=1$.

The reusable active material may have a fluorine (F) content of 100 ppm or less.

The lithium precursor may be added in an amount corresponding to an amount of lithium depleted during the steps (a) and (b).

Another method of reusing a positive electrode active material according to the present disclosure includes (a) thermally treating a positive electrode scrap comprising a lithium composite transition metal oxide positive electrode active material layer including nickel, cobalt and manganese on a current collector in air at 300 to 650° C, for thermal decomposition a binder and a conductive material in the active material layer, to separate the current collector from the active material layer, and collecting an active material in the active material layer, (b) washing the active material collected from the step (a) with a lithium compound solution which is basic in an aqueous solution, the lithium compound solution comprising a lithium compound in an amount of more than 0% and 15% or less, and drying, and (c) annealing the active material washed from the step (b) in air at 400 to 1000° C with an addition of at least one of LiOH, $Li_2CO_3$, $LiNO_3$ or $Li_2O$.

The method may further include (d) surface-coating the active material annealed from the step (c) with at least one of a metal, an organic metal or a carbon material by a solid or liquid phase process and thermally treating at 100 to 1200° C.

Advantageous Effects

According to the present disclosure, it is possible to reuse waste positive electrode active materials such as positive electrode scrap generated in the lithium secondary battery fabrication process without using acids, thereby achieving eco-friendliness. The method according to the present disclosure does not need a neutralization process or a waste water treatment process, thereby achieving environmental mitigation and process cost reduction.

According to the present disclosure, it is possible to collect all the metal elements of the positive electrode active materials. It is possible to collect the current collector since it does not dissolve the current collector. This method does not use the extracted active material elements as raw materials for positive electrode active material synthesis, and instead directly uses the active materials collected in the form of powder, thereby achieving economical efficiency.

According to the present disclosure, toxic and explosive solvents such as NMP, DMC, acetone and methanol are not used, thereby achieving safety, and since simple processes such as thermal treatment, washing and annealing are used, it is easy to manage the process and suitable for mass production.

According to the present disclosure, it is possible to ensure excellent resistance characteristics and capacity characteristics without electrochemical performance degradation of the collected active materials.

BRIEF DESCRIPTION OF THE DRAWINGS

The accompanying drawings illustrate the embodiments of the present disclosure, and together with the following detailed description, serve to provide a further understanding of the technical aspects of the present disclosure, and thus the present disclosure should not be construed as being limited to the drawings.

DETAILED DESCRIPTION

Figure 1:
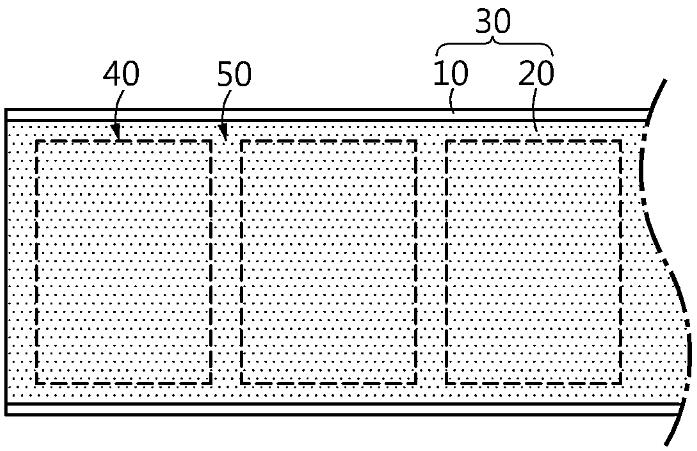
FIG. 1 is a diagram showing positive electrode scrap discarded after punching a positive electrode plate in a positive electrode sheet.

Hereinafter, the embodiments of the present disclosure will be described with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations in the drawings are just an example, and do not fully describe the technical aspect of the present disclosure, so it should be understood that a variety of other equivalents and modifications could have been made thereto at the time of filing the patent application.

In the following description, a reference is made to the accompanying drawings that make up some of the present disclosure. The embodiments described in the detailed description, the drawings and the appended claims are not intended to be limiting. Other embodiments may be used without departing from the technical aspect and scope of the subject matter disclosed herein, and modifications and changes may be made thereto. As commonly described herein and illustrated in the drawings, the aspects of the present disclosure may include arrangement, substitution, combination, separation and design of a variety of different elements, and it will be immediately understood that all of them are clearly taken into account.

Unless otherwise defined, all terms (including technical and scientific terms) used herein have the same meaning as commonly understood by those having ordinary skill in the technical field pertaining to the present disclosure (hereinafter those skilled in the art).

The present disclosure is not limited to specific embodiments described herein. As obvious to those skilled in the art, many modifications and changes may be made thereto without departing from the technical aspects and scope of the present disclosure. In addition to those enumerated herein, functionally equivalent methods in the scope of the present disclosure will be obvious to those skilled in the art from the previous descriptions. Such modifications and changes fall in the scope of the appended claims. The present disclosure will be defined by the appended claims along with the scope of all equivalents to which the appended claims are entitled. It should be understood that the present disclosure is not limited to specific variant methods. It should be further understood that the terms used herein are for the purpose of describing the specific embodiments, but not intended to limit the present disclosure.

The conventional active material reuse process is mainly aimed at extracting the elements of invaluable metals (nickel, cobalt, manganese) in active materials of lithium secondary batteries of which the performance degraded after use and re-synthesizing the active materials, and as opposed to the conventional process, the present disclosure is characterized as collecting active materials from positive electrode scrap generated in the lithium secondary battery fabrication process.

In addition, the well-known active material reuse process involves producing metals (direct reduction method) or resynthesized active materials from invaluable metals extracted through acid/base dissolution or melting using reduction agents/additives, which requires an additional chemical method, making the process complex and causing additional economical expenses. However, the present disclosure relates to a method for reusing positive electrode active materials directly without dissolving the positive electrode active materials.

To directly reuse the positive electrode active materials, it is necessary to remove the current collector from the positive electrode. The current collector may be removed from the positive electrode by removing the binder through high temperature thermal treatment, melting the binder using the solvent, melting the current collector, and screening the active materials through dry milling and sieving.

When melting the binder using the solvent, the stability of the solvent is important. NMP is the most efficient solvent, but its disadvantage is toxicity and high cost. Another disadvantage is that a waste solvent re-treatment or solvent collection process is necessary. Melting the current collector requires a lower process cost than using the solvent. However, it is difficult to remove impurities from the reusable active material surface, and hydrogen gas is produced in the current collector removal process, causing an explosion risk. Dry milling and sieving cannot perfectly separate the current collector and the active material. The particle size distribution of the active materials changes in the milling process and it is difficult to remove the binder, resulting in characteristics degradation of batteries including the reusable active materials.

The present disclosure separates the active material and the current collector using high temperature thermal treatment. In particular, thermal treatment is performed in air, so the process only requires heating without any special device configuration and thus is relatively simple, and it is suitable for mass production and commercialization. However, impurities should not remain on the reusable active material surface. The present disclosure proposes removing impurities from the reusable active material surface.

Figure 2:
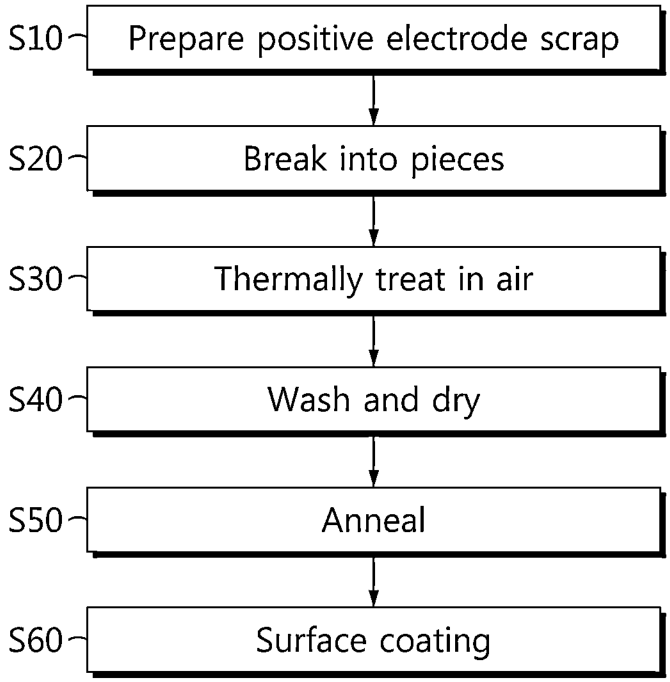
FIG. 2 is a flowchart of an active material reuse method according to the present disclosure.

Hereinafter, the active material reuse method according to an embodiment of the present disclosure will be described with reference to FIG. 2. FIG. 2 is a flowchart of the active material reuse method according to the present disclosure.

Referring to FIG. 2, first, waste positive electrode scrap is prepared (S10).

As described above with reference to FIG. 1, positive electrode scrap may be leftover after manufacturing a positive electrode sheet including a positive electrode active material layer on a current collector and punching the positive electrode sheet. In addition, positive electrode scrap may be prepared by collecting positive electrodes in which defects or failures occurred during the process. Additionally, positive electrode scrap may be prepared by separating positive electrodes from lithium secondary batteries discarded after use.

For example, positive electrode scrap may be the leftover after coating a slurry on a sheet type current collector of an aluminum foil, the slurry prepared by adding N-methyl pyrrolidone (NMP) to lithium composite transition metal oxide comprising nickel (Ni), cobalt (Co) and manganese (Mn) (hereinafter simply referred to as NCM-based lithium composite transition metal oxide) as an active material, carbon such as carbon black as a conductive material and polyvinylidene fluoride (PVdF) as a binder and mixing, then drying in a vacuum oven of about 120° C to manufacture a positive electrode sheet, and punching the positive electrode plate into a predetermined size.

The positive electrode active material of lithium secondary batteries includes lithium composite transition metal oxide, and in particular, lithium cobalt oxide such as $LiCoO_2$, lithium manganese oxide ($LiMnO_2$ or $LiMn_2O_4$), lithium iron phosphate compounds ($LiFePO_4$) or lithium nickel oxide ($LiNiO_2$). Additionally, to improve low thermal stability while maintaining excellent reversible capacity of $LiNiO_2$, nickel manganese-based lithium composite metal oxide with the partial substitution of manganese (Mn) having excellent thermal stability for nickel (Ni) and NCM-based lithium composite transition metal oxide substituted with manganese (Mn) and cobalt (Co) are used. In particular, the present disclosure proposes reusing NCM-based lithium composite transition metal oxide active material.

The positive electrode scrap has the active material layer on the current collector of a metal foil such as the aluminum foil. The active material layer is formed by coating the slurry including a mixture of the active material, the conductive material, the binder and the solvent, and after solvent volatilization, the active material and the conductive material are bonded by the binder. Accordingly, when the binder is removed, the active material may be separated from the current collector.

Subsequently, the positive electrode scrap is broken into pieces to a proper size (S20). Breaking into pieces refers to cutting or shredding of the positive electrode scrap to a proper size for handling. After the cutting or shredding, the size of the positive electrode scrap is reduced to, for example, 1 cm×1 cm. A variety of dry milling equipment including a hand-mill, a pin-mill, a disk-mill, a cutting-mill and a hammer-mill, and a high speed cutter may be used to break into pieces.

The cutting or shredding may be performed considering the handling of the positive electrode scrap and the characteristics required in equipment used in the subsequent processes. For example, when equipment requiring continuous treatment in the loading and unloading of the positive electrode scrap is used, it is necessary to break too large positive electrode scrap into pieces to facilitate the movement of the positive electrode scrap.

Subsequently, the positive electrode scrap is thermally treated in air (S30).

In the present disclosure, thermal treatment is performed for thermal decomposition of the binder in the active material layer. The thermal treatment may be performed at 300 to 650° C, and may be referred to as high temperature thermal treatment. At temperatures of less than 300° C, it is difficult to remove the binder, failing to separate the current collector, and at temperatures of 650° C or above, the current collector melts (Al melting point: 660° C), failing to separate the current collector.

The thermal treatment time is long enough for thermal decomposition of the binder. For example, the thermal treatment time is about 30 min. Preferably, the thermal treatment time is 30 min. or longer. As the thermal treatment time increases, the thermal decomposition of the binder is prolonged, but when the thermal treatment time is equal to or longer than a predetermined time, there is no difference in thermal decomposition effect. Preferably, the thermal treatment time is 30 min. or longer and 5 hours or shorter.

The thermal treatment equipment may include various types of furnaces. For example, the thermal treatment equipment may be a box type furnace, and when considering productivity, may be a rotary kiln capable of continuous treatment.

The thermal treatment may be followed by fast or slow cooling in air.

For example, the thermal treatment may be performed at 550° C for 30 min. at the temperature rise rate of 5° C/min. For example, the temperature rise rate is within the allowable range of the box type furnace and is enough to heat the positive electrode scrap without thermal shock. 550° C is for good thermal decomposition of the binder, taking into account the melting point of the Al current collector. When the thermal treatment is performed at the above-described temperature for less than 10 min, thermal decomposition is insufficient, and thus it is necessary to perform the thermal treatment for 10 min. or longer, and preferably for 30 min. or longer.

$CO_2$ and $H_2O$ produced by the thermal decomposition of the binder and the conductive material in the active material layer through the thermal treatment in air are removed. Since the binder is removed, the active material may be separated from the current collector and the active material to collect may be screened in the form of powder. Accordingly, the current collector may be separated from the active material layer and the active material in the active material layer may be collected by S30.

It is important to perform the thermal treatment of S30 in air. When the thermal treatment is performed in a reducing or inert gas atmosphere, the binder and the conductive material suffer carbonization rather than thermal decomposition. When carbonized, carbon remains on the active material surface and degrades the performance of the reusable active materials. When the thermal treatment is performed in air, carbon in the binder or the conductive material is removed by combustion reaction with oxygen to produce CO, $CO_2$ gas, and thus the binder and the conductive material do not remain and are almost removed.

Accordingly, according to the present disclosure, the active material is collected in the form of powder, and carbon produced by the carbonization of the binder or the conductive material may not remain on the surface.

Subsequently, the collected active material is washed and dried (S40). It is important to wash with a lithium compound solution which is basic in an aqueous solution. The lithium compound solution contains a lithium compound, preferably LiOH, in an amount of more than 0% and 15% or less. Preferably, the amount of LiOH is 15% or less. When LiOH is included in an excessive amount, excess LiOH may remain on the active material surface after washing, which may affect the subsequent annealing process. It is undesirable to add excess LiOH to make the active material surface before annealing as clean as possible, and the amount of LiOH is limited to 15% or less.

The washing may be performed by immersing the collected active material in the lithium compound solution. The washing may be performed within a week after immersion, preferably a day, and more preferably 1 hour. When washing is performed for a week or longer, the capacity may reduce due to excessive lithium dissolution. Accordingly, it is desirable to wash within 1 hour. The washing includes immersing the active material in the lithium compound solution which is basic in an aqueous solution, and stirring in the immersed state. It is desirable to perform immersion and stirring together. When the active material is immersed in the lithium compound solution without stirring, the washing process is slow, resulting in lithium dissolution. When stirring is performed together, the process time is minimized, and accordingly it is desirable to perform the stirring at the same time with the immersion in the lithium compound solution. The drying may be performed in air in an oven (convection type) after filtration.

The washing with the lithium compound solution which is basic in an aqueous solution is performed for removal of LiF and metal fluoride that may be present on the surface of the collected active material and surface modification. During the thermal treatment of S30, the binder and the conductive material in the active material layer are removed by evaporation of $CO_2$ and $H_2O$, and in this process, $CO_2$ and $H_2O$ react with lithium on the active material surface to produce $Li_2CO_3$, LiOH, and fluorine (F) present in the binder such as PVdF reacts with the metal element of the positive electrode active material to produce LiF or metal fluoride. When LiF or metal fluoride remains, the characteristics of batteries including the reusable active materials degrade. The present disclosure adds the washing step of S40, to remove reactants that may be generated on the reusable active material surface during the thermal treatment step (S30), in order to prevent impurities from remaining on the reusable active material surface.

In S40, it is important to wash with the lithium compound solution which is basic in an aqueous solution. When a sulfuric acid or hydrochloric acid aqueous solution is used instead of the lithium compound solution which is basic in an aqueous solution, F on the active material surface is washed out, but the performance of the reusable positive electrode active materials may degrade due to dissolution of transition metal (Co, Mg) present in the active material. The lithium compound solution which is basic in an aqueous solution used in the present disclosure plays a role in removing trace amounts of binder that may be left after the thermal decomposition of S30, does not dissolve the transition metal present in the active material, and compensates for the amount of lithium dissolved in the washing process.

Through S40, the present disclosure may adjust the LiF content on the collected active material surface to less than 500 ppm, thereby improving the capacity. Preferably, the F content may be 100 ppm or less. More preferably, the F content may be 30 ppm or less.

Subsequently, the washed active material is annealed with an addition of a lithium precursor (S50).

Losses of lithium in the active material may occur through the previous steps S30 and S40. S50 compensates for the lithium loss.

Besides, in S50, the crystal structure of the active material is recovered through annealing, so the characteristics of the reusable active material may be recovered or improved to the level of unused fresh active material.

The transformation structure may be found in the active material surface through the previous steps S30 and S40. For example, NCM-based lithium composite transition metal oxide as the active material may have a spinel structure due to transformation of Ni into rock-salt [$NiCO_3 \cdot 2Ni(OH)_2$) $H_2O$] by the moisture in S40. When batteries are manufactured in this state, the battery characteristics may degrade such as capacity reduction. The present disclosure recovers the crystal structure through S50. For example, NCM-based lithium composite transition metal oxide as the active material is recovered to a hexagonal structure. Accordingly, it is possible to recover or improve the initial characteristics to the similar level to fresh active material.

The lithium precursor in S50 may be at least one of LiOH, $Li_2CO_3$, $LiNO_3$ or $Li_2O$.

The lithium precursor is added in an amount for adding lithium at a ratio of lithium loss to a ratio between lithium and other metal in the raw active material (i.e., fresh active material) used in the active material layer. For example, when the ratio between lithium and other metal in the fresh active material is 1, the lithium precursor may be added in an amount for adding lithium at the molar ratio of 0.001 to 0.4. It is proper to add lithium at a molar ratio of 0.01 to 0.2. The addition of the lithium precursor exceeding the lithium lost through washing causes unreacted lithium precursors to be left on the reusable active material, resulting in the increased resistance in the active material reuse process, and accordingly it is necessary to feed the lithium precursor in an optimal amount.

Additionally, the lithium precursor is preferably added in an amount for adding more lithium at the molar ratio of 0.0001 to 0.1 based on a 1:1 molar ratio of lithium:other metal. The addition of excess lithium is for forming a surface protection layer on the active material by surface-coating, and it will be described in more detail below. When secondary batteries are manufactured using the active material, it is possible to suppress the side reactions by the electrolyte solution and maintain the life characteristics.

The annealing may be performed in air at 400 to 1000° C. The annealing temperature may be 600 to 900° C. The temperature is subject to change within the limited range depending on the type of the lithium precursor. The annealing time may be at least 1 hour. Preferably, the annealing time is about 5 hours. When the annealing time is long, the crystal structure may be sufficiently recovered, but the prolonged annealing does not greatly affect the performance. The annealing time is, for example, about 15 hours or less. The annealing equipment may be similar or identical to that of the thermal treatment step S30.

For example, when $Li_2CO_3$ is used as the lithium precursor, the annealing temperature is preferably 700 to 900° C, and more preferably, 710 to 780° C. It is because the melting point of $Li_2CO_3$ is 723° C. Most preferably, the annealing is performed at 750° C. When LiOH is used as the lithium precursor, the annealing temperature is preferably 400 to 600° C, and more preferably, 450 to 480° C. It is because the melting point of LiOH is 462° C.

Preferably, the annealing temperature is higher than the melting point of the lithium precursor. However, at temperatures higher than 1000° C, the thermal decomposition of the positive electrode active material occurs and degrades the performance of the active material, and accordingly the annealing temperature does not exceed 1000° C.

The reusable active material may be obtained through S50.

Optionally, S60 may be performed. In S60, surface-coating is performed on the active material annealed in S50.

The surface-coating step may include coating at least one of a metal, an organic metal or a carbon material on the surface by a solid or liquid phase process and thermally treating at 100 to 1200° C. When thermal treatment is performed at higher temperatures than 1200° C, performance degradation may occur due to the thermal decomposition of the positive electrode active material. In the surface-coating, coating on the surface by a solid or liquid phase process may use mixing, milling, spray drying and grinding.

Through the surface-coating, a surface protection layer of different metals is formed. In case that the molar ratio of lithium:other metal in the positive electrode active material is 1:1, when the molar ratio of lithium:other metal in the positive electrode active material reduces to less than 1:1 by the reaction of lithium in the active material with the surface coating material, it fails to exhibit the capacity 100%. Accordingly, excess lithium is added to compensate for the lithium loss in the previous step S50 so that the molar ratio of lithium:other metal in the positive electrode active material is 1:1, as well as to include more lithium at a molar ratio of 0.0001 to 0.1 to other metal in the positive electrode active material. Accordingly, it is possible to form the surface protection layer such that the molar ratio of lithium: other metal in the positive electrode active material is 1:1 in the surface-coating.

In detail, when the active material is coated with metal oxide such as B, W, B—W and thermally treated, a lithium boron oxide layer may be formed on the active material surface, and this serves as the surface protection layer. The lithium additionally included at the molar ratio of 0.0001 to 0.1 in S50 reacts with metal oxide such as B, W, B—W in S60, and the molar ratio of lithium:other metal in the positive electrode active material does not reduce to less than 1:1, so there is no capacity reduction.

The reusable active material obtained by the above-described method may be represented by Formula 1.

$$Li_aNi_xMn_yCo_zM_wO_{2+\delta} \quad \text{[Formula 1]}$$

where M comprises at least one selected from the group consisting of B, W, Al, Ti and Mg, $1<a\leq1.1$, $0<x<0.95$, $0<y<0.8$, $0<z<1.0$, $0\leq w\leq0.1$, $-0.02\leq\delta\leq0.02$, $x+y+z+w=1$.

The reusable active material may have the F content of 100 ppm or less. According to the present disclosure, the active material having the reduced F content may be collected, and when reused as active materials, may provide excellent resistance characteristics and capacity characteristics.

According to the present disclosure, LiF or metal fluoride is removed in the washing step of S40. The step of washing using the lithium compound solution which is basic in an aqueous solution and drying is safe and low-priced, and may remove LiF or metal fluoride without losses of other elements, prevent the dissolution of transition metal, and compensate for the lithium loss occurring during the process. The annealing step is also safe and low-priced and may recover the crystal structure, i.e., improve the crystallinity, thereby enhancing the battery characteristics of the reusable active material.

The reusable active material obtained according to the present disclosure may have a similar particle size distribution to fresh active material, thereby eliminating the need for separate treatment to adjust the particle size distribution. Since carbon produced by carbonization of the binder or the conductive material does not remain on the surface, there is no need for a carbon removal step. Accordingly, the active material obtained through the method of FIG. 2 may be used to manufacture the positive electrode without any treatment.

The reusable active material may be used 100% without composition adjustment or mixed with fresh active material, and may be used to prepare a slurry in combination with a conductive material, a binder and a solvent.

Hereinafter, the experimental example of the present disclosure will be described in detail.

Experimental Example

The electrochemical performance is evaluated using each of the positive electrode active materials prepared by the method of examples and comparative examples as described below.

Example 1: Reusable active material is collected by the active material reuse method of the present disclosure as described above. Positive electrode scrap discarded after punching the positive electrode plate having NCM-based lithium composite transition metal oxide as the active material is prepared and the thermal treatment of S30 is performed at 550° C for 30 minutes. The washing of S40 is performed for 10 minutes using LiOH. In S50, annealing is performed at 750° C for 15 hours with an addition of the lithium precursor ($Li_2CO_3$) in an amount for adding more lithium at the molar ratio of 0.09 during the process based on the molar ratio (Inductively Coupled Plasma (ICP) analysis) of lithium and other metal in the raw active material. Theoretically, in the case of fresh active material, the molar ratio of lithium:other metal is 1:1, but since an average error of ICP equipment for measuring the molar ratio is ±0.05, and preferably about ±0.02, the molar ratio of lithium:other metal in the raw active material may be 1±0.05:1 through ICP measurement. In this experiment, the lithium precursor is added based on the analysis ratio through ICP analysis.

Example 2: In addition to example 1, the active material surface protection layer recovery process of S60 is performed.

Comparative example 1: Fresh NCM-based lithium composite transition metal oxide, not reusable active material, is used.

Comparative example 2: Only thermal treatment of S30 in the active material reuse method of the present disclosure as described above is performed to remove the binder and the conductive material and separate the Al current collector, and NCM-based lithium composite transition metal oxide active material is collected. S30 is performed in the same condition as example 1. In the active material reuse method of the present disclosure, surface modification of S40, crystal structure recovery of S50 and surface coating of S60 are not performed.

Comparative example 3: Further to comparative example 2, active material is collected by performing the surface modification of S40 of the active material reuse method of the present disclosure. That is, surface modification is performed, but in the active material reuse method of the present disclosure, crystal structure recovery of S50 and surface coating of S60 are not performed. S40 is performed in the same condition as example 1.

Comparative example 4: Further to comparative example 2, NCM-based lithium composite transition metal oxide active material is collected by performing the crystal structure recovery of S50 of the active material reuse method of the present disclosure without the surface modification of S40. As opposed to example 1, annealing for crystal structure recovery is performed without lithium precursor addition.

Comparative example 5: S30, S40 and S50 of the active material reuse method are performed in the same way as example 1. However, as opposed to example 1, annealing for crystal structure recovery is performed without lithium precursor addition.

ICP analysis is performed on the positive electrode active material collected or prepared in each of the examples and comparative examples to analyze an amount of remaining LiF, a ratio of lithium and other metal in the active material, and an amount of a specific element such as B or W.

Additionally, the electrochemical performance is evaluated using cells (Coin Half Cell, CHC) manufactured by metering 96.25 wt % of the positive electrode active material collected or prepared in each of the examples and comparative examples, 1.5 wt % of carbon black as the conductive material and 2.25 wt % of PVdF as the binder, mixing with NMP to prepare a slurry and manufacturing the positive electrode.

To determine an amount of LiF remaining in the active material collected in comparative examples 2 and 3, F detection and analysis is performed by ICP. The result is shown in the following Table 1.

TABLE 1

| | Comparative example 2 | Comparative example 3 |
|---|---|---|
| F content (mg/kg) | 1450 | ND |

ND indicates 30 ppm or less as measured. Referring to Table 1, a significant reduction in the F content in the collected positive electrode active material is found in comparative example 3 compared to comparative example 2. That is, it can be seen that LiF is completely dissolved in the lithium compound solution by washing, and thus removed so thoroughly that it cannot be detected by ICP. Accordingly, it can be seen that LiF removal is performed remarkably well by S40.

To identify if there is a change of lithium in the positive electrode active material during S30 and S40 of the present disclosure, a ratio of lithium/other metal in the active material is analyzed by ICP. The result is shown in the following Table 2.

TABLE 2

| | Comparative example 1 | Comparative example 2 | Comparative example 3 |
|---|---|---|---|
| Ratio of lithium and other metal in active material | 0.99 | 0.95 | 0.91 |

Referring to Table 2, it can be seen that comparative example 2 has a reduction in the ratio of lithium/other metal by approximately 0.2 to 0.5 through thermal treatment of S30 compared to comparative example 1, and comparative example 3 has a reduction in the ratio of lithium/other metal by approximately 0.2 to 0.5 through washing and drying of S40 compared to comparative example 2. It seems that NCM-based lithium composite transition metal oxide has a significant reduction in the ratio of lithium to other metal due to a relatively large specific surface area of particles and transformation to the spinel structure. Accordingly, it can be seen that it is necessary to compensate for the deficient lithium.

Table 2 shows the values measured by ICP analysis, and ICP analysis has an error value of about ±0.02 as mentioned above. Accordingly, in comparative example 1 of fresh active material, the ratio of lithium and other metal may be smaller than 1. Accordingly, an amount of lithium precursor added to compensate for lithium loss is a reduced amount of lithium based on the ratio (the molar ratio analyzed by ICP) of lithium and other metal in the raw active material (i.e., fresh active material) used in the active material layer.

Figure 3:
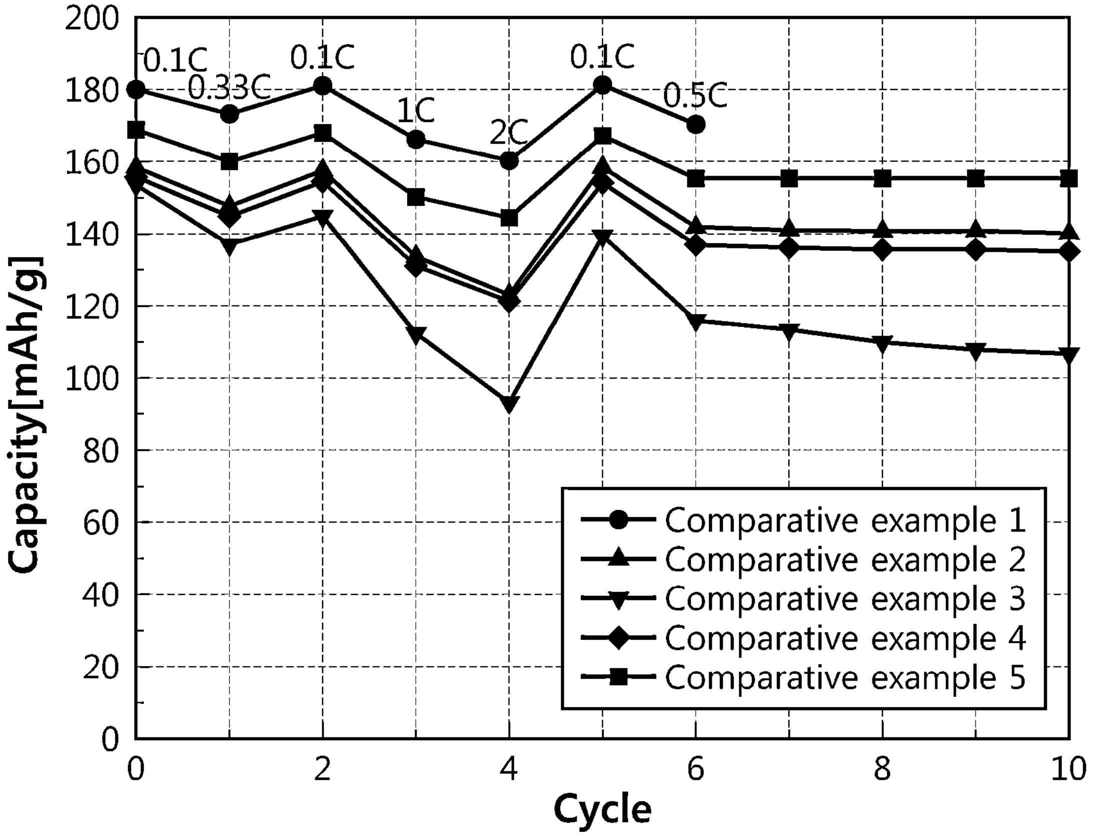
FIGS. 3 and 4 show the results of cell evaluation using active materials of example and comparative examples.
Figure 4:
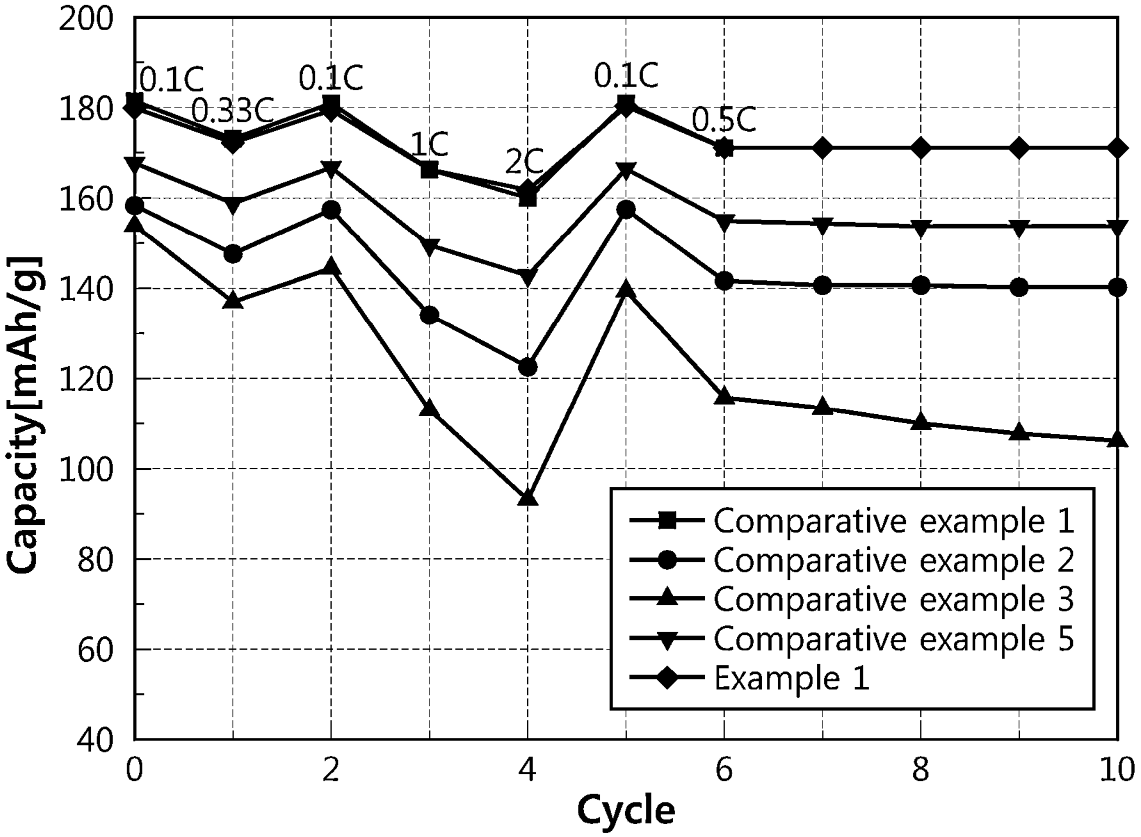

FIGS. 3 and 4 show the results of cell evaluation using the active materials of example and comparative examples. At different currents, the rate performance is evaluated by evaluating the capacity as a function of cycle number. The equipment used for evaluation is a charge/discharge tester commonly used in the lab. There is no difference depending on the measuring device or method. In the graphs of FIGS. 3 and 4, the horizontal axis indicates the cycle number and the vertical axis indicates capacity.

Voltage is 3 to 4.3V, and initial formation charge/discharge is performed at 0.1 C/0.1 C. The electrolyte solution for the cell is a carbonate based electrolyte solution and includes Ethylene carbonate (EC):Ethyl methyl carbonate (EMC)=3:7 with an addition of additives.

First, referring to FIG. 3, in the case of comparative example 2 before surface modification and comparative example 3 after surface modification following primary thermal treatment (550° C/30 min) for desorption, comparative example 3 gone through surface modification shows a rapid reduction in electrode capacity. This is because Ni in NCM-based lithium composite transition metal oxide transforms into rock-salt by moisture as mentioned above, resulting in capacity reduction.

However, when annealing (750° C/15 hr) is performed without surface modification, this corresponds to comparative example 4, and when compared with comparative example 2, there is little capacity improvement effect. This is due to LiF remaining on the active material surface when surface modification is not performed. As shown above in Table 1, LiF is removed at a satisfactory level by washing.

When surface modification and annealing are performed after primary thermal treatment, the capacity increases as shown in comparative example 5. The reason is that although the capacity reduces after surface modification as shown in comparative example 3, Ni rock-salt is reduced through annealing after removal of LiF by surface modification and its structure is recovered to a hexagonal shape.

Subsequently, referring to FIG. 4, it is found that example 1 has the improved capacity, compared to comparative example 5. Compared to comparative example 5, example 1 performs annealing with an addition of the lithium precursor. It can be seen that the capacity is improved by compensating for lithium lost in the previous steps by the addition of the lithium precursor. The lithium loss through thermal treatment and washing is described with reference to Table 2.

The lithium compound is added at a ratio of lithium loss to the existing lithium content in the positive electrode active material based on the results of ICP analysis (Table 2), and as a result, the addition at the molar ratio of 0.09 to 0.1 shows the capacity improvement effect at the equivalent level to comparative example 1 as can be seen from the additional experiment.

According to the present disclosure, it is possible to collect the active material from the positive electrode scrap at the directly usable level. It is safe since toxic and explosive solvents such as NMP, DMC, acetone and methanol are not used, and since simple and safe processes such as thermal treatment, washing and drying, and annealing are used, it is suitable for mass production.

Figure 5:
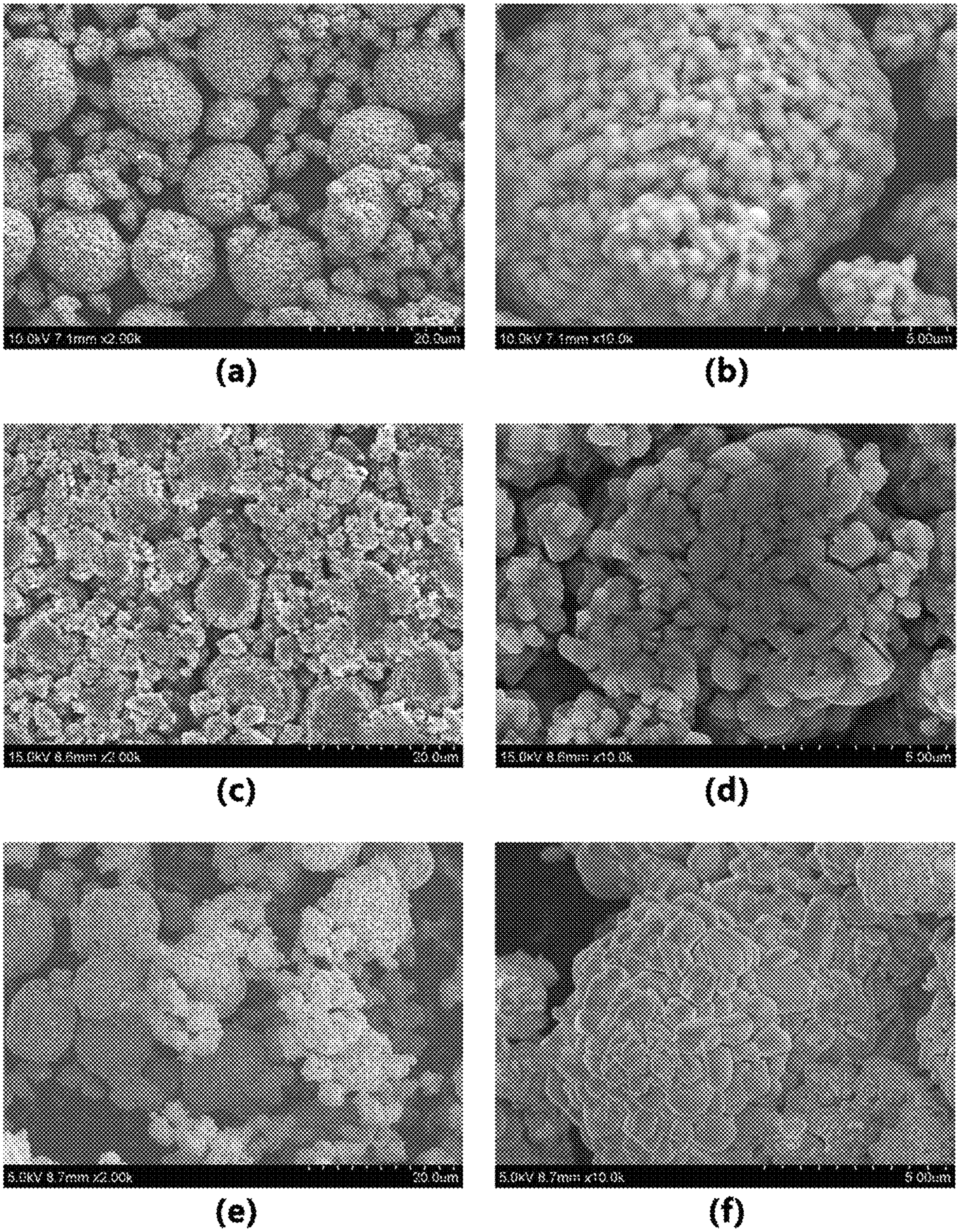
FIGS. 5 and 6 are scanning emission microscope (SEM) images of active materials of example and comparative examples.
Figure 6:
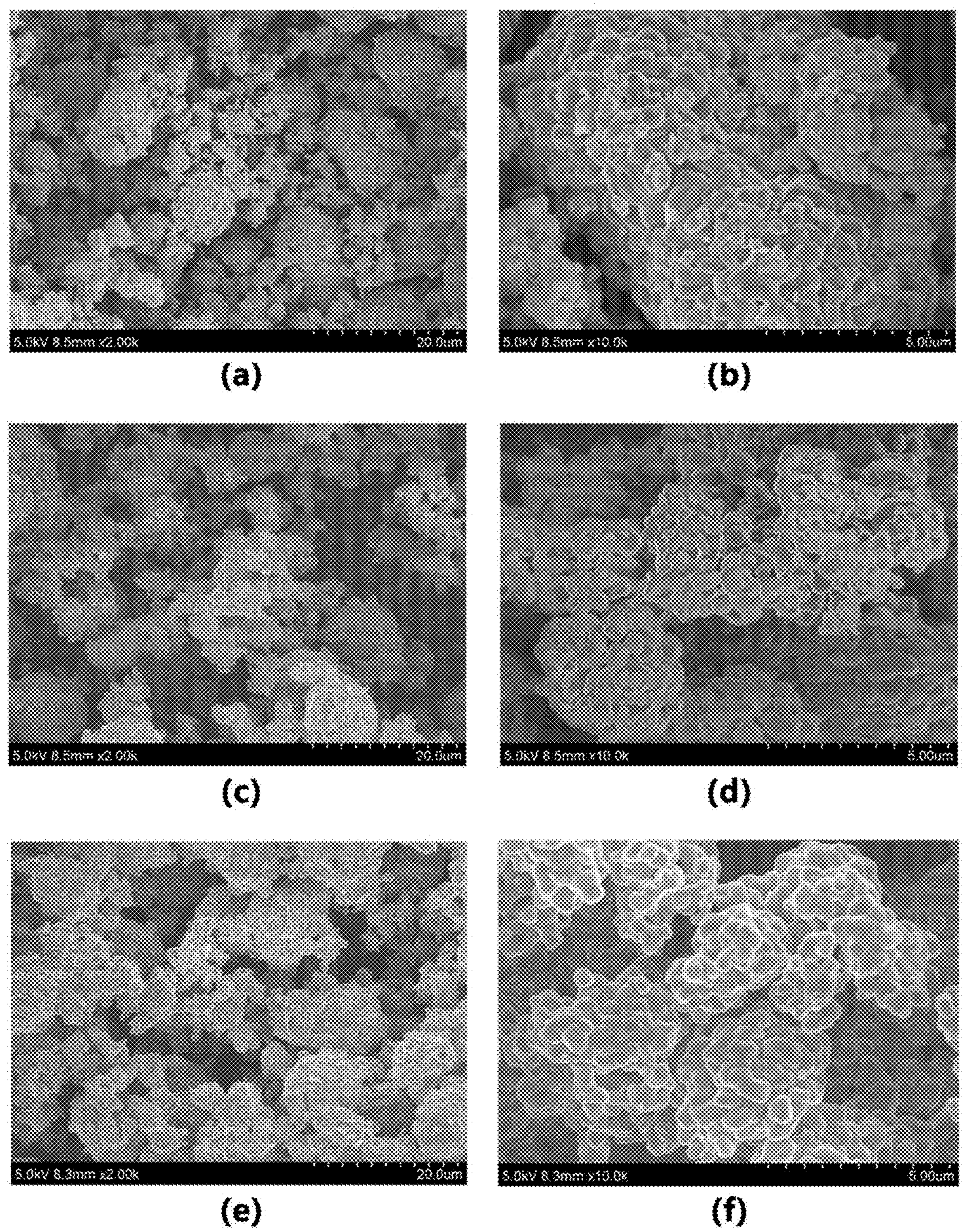

FIGS. 5 and 6 are scanning emission microscope (SEM) images of the active materials of example and comparative examples. The SEM images are captured using SEM equipment commonly used in the lab. For example, imaging may be performed using HITACHI s-4200. However, there is no difference depending on the measuring device or method.

(a) of FIG. 5 is a SEM image of the fresh active material of comparative example 1, and (b) is an enlarged image of (a). (c) shows the surface of positive electrode scrap from fresh active material, and (d) is an enlarged image of (c). The fresh active material has no particle cracking or chipping, but positive electrode scrap from the electrode shows pressed and cracked or chipped particles on the surface by the roll pressing process.

(e) of FIG. 5 is a SEM image of comparative example 2, and (f) is an enlarged image of (e). Referring to (e) and (f), the binder or the conductive material is not observed in the collected active material. That is, it can be seen that the binder or the conductive material is removed during high temperature thermal treatment. Accordingly, it can be seen that the active material is separated from the current collector and the binder or the conductive material is seldom left on the active material surface by thermal treatment in air.

(a) of FIG. 6 is a SEM image of comparative example 3, and (b) is an enlarged image of (a). When comparing (c) and (d) of FIG. 5 showing positive electrode scrap, it can be seen that particles are dispersed through the process.

(c) of FIG. 6 is a SEM image of comparative example 5, and (d) is an enlarged image of (c). (e) is a SEM image of example 1 and (f) is an enlarged image of (e). It can be seen that the particles dispersed in the previous step form agglomerates through annealing. Additionally, when comparing (f) of FIG. 6 with (a) of FIG. 5, it can be seen that the reusable active material of example 1 shows the same shape as fresh active material.

Figure 7:
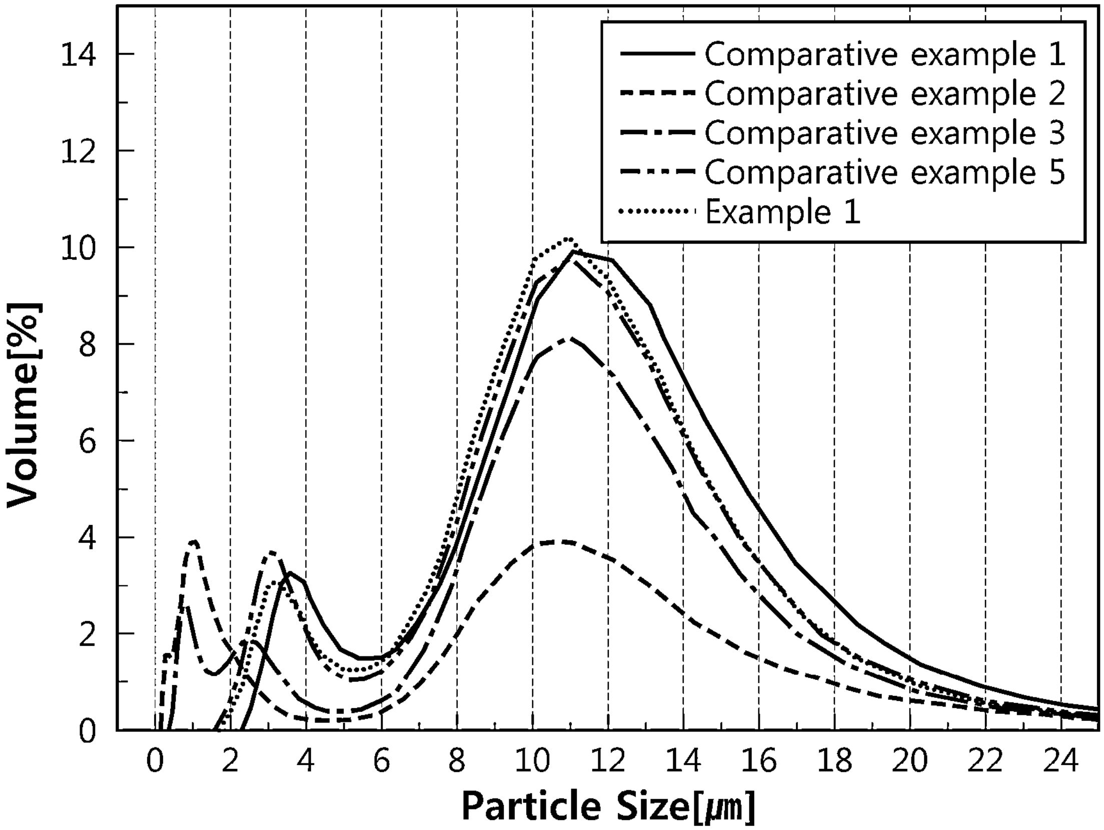
FIG. 7 is a particle size distribution graph of active materials of example and comparative examples.

FIG. 7 is a particle size distribution graph of the active materials of example and comparative examples. The particle size distribution may be obtained using a particle size analyzer commonly used in the lab. For example, measurements may be performed using Horiba LA 950V2 particle size analyzer. However, there is no difference depending on the measuring device or method. In FIG. 6, the horizontal axis is particle size (um) and the vertical axis is volume %.

The particle size distribution graph results of FIG. 7 are consistent with the SEM results of FIGS. 5 and 6. Since the NCM-based active material suffers severe particle cracking or chipping by the roll pressing in the electrode formation, a large amount of small particles is observed in the particle size distribution of comparative example 2 after primary thermal treatment, and comparative example 3 after surface modification shows a higher distribution of small particles. However, when annealing is performed, particle agglomeration increases as shown in the previous SEM results, so comparative example 5 or example 1 has a similar particle size distribution to comparative example 1 of fresh active material. In particular, the particle size distribution of example 1 is more similar to that of comparative example 1. Volume % of particles having the same particle size with a difference in the range of ±2% is defined as the similar particle size distribution. According to the present disclosure, the particle size distribution of the reusable active material is not different from that of fresh active material and the initial characteristics are almost maintained, and it is expected that the characteristics of batteries including the reusable active materials will be on a similar level to the characteristics of batteries using fresh active materials.

An amount of a specific element is analyzed by performing ICP analysis on the positive electrode active material collected or prepared in each of the example and comparative examples. The result is shown in the following Table 3.

TABLE 3

| | B content (mg/kg) | W content (mg/kg) |
|---|---|---|
| Comparative example 1 | 500 | 3100 |
| Comparative example 2 | 200 | 2700 |
| Comparative example 3 | ND | 200 |
| Comparative example 5 | ND | 200 |
| Example 1 | ND | 200 |

The fresh active material used in this experiment further includes B and W as seen in comparative example 1. In the case of comparative example 2, it can be seen that the B and W content reduces through thermal treatment, and the remaining results reveal that B is almost completely removed in the subsequent processes. In the case of W, it can be seen that a large amount is removed in the surface modification process through washing as in comparative example 3.

Accordingly, a specific element may be lost during the process according to the type of the active material initially used, and in particular, may be completely removed or remain in a small amount in the surface modification process through washing, and in some instances, the characteristics may not be completely recovered by performing the annealing as in example 1. In such a case, it is desirable to perform an additional surface-coating step as proposed. In this experimental example, the surface-coating step includes coating with B and W. The surface-coating may serve as the surface protection layer of the positive electrode active material. The surface-coating may be a process of compensating for a deficient specific element, and at the same time, recovering the surface protection layer in the fresh active material. In the case of the fresh active material used in this experiment, the surface protection layer includes B—W, and lithium loss during the process is interpreted as a ratio of (lithium in the active material itself+lithium for forming the surface protection layer):other metal, not a 1:1 ratio of lithium in the active material itself and other metal. Accordingly, in the above experiment, the molar ratio of 0.09 of the lost lithium such as shown in comparative example 3 may be interpreted as the sum of lithium in the positive electrode active material and lithium for forming the surface protection layer, and in the embodiments, the lithium precursor is added in an amount for replenishing lithium.

The surface-coating step goes through a thermal treatment process after solid or liquid phase reaction.

When the reusable active material is represented by the following Formula 1, $$Li_aNi_xMn_yCo_zM_wO_{2+\delta} \quad \text{[Formula 1]}$$

where M comprises at least one selected from the group consisting of B, W, Al, Ti and Mg, $1<a\leq1.1$, $0<x<0.95$, $0<y<0.8$, $0<z<1.0$, $0\leq w\leq0.1$, $-0.02\leq\delta\leq0.02$, $x+y+z+w=1$, it is thought that M in Formula 1 is replenished through surface-coating.

When the surface coating layer includes B, B—W, B—Ti, B—W—Ti, the surface-coating thermal treatment may be performed at temperatures of 200 to 500° C, and coating may be performed using other metal materials, carbon materials and organic metal materials at temperatures between 100 and 1200° C.

According to the present disclosure, it is possible to reuse positive electrode scrap using a simple, eco-friendly and economical method, and a lithium secondary battery manufactured reusing the prepared NCM-based lithium composite transition metal oxide positive electrode active material does not have a problem with the battery performance.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the scope of the appended claims and their equivalents.

What is claimed is:

1. A method for recovering a positive electrode active material, comprising:

(a) thermally treating a positive electrode scrap comprising an active material layer on a current collector in air for thermal decomposition of a binder and a conductive material in the active material layer to separate the current collector from the active material layer, and collecting an active material in the active material layer;

(b) washing the active material collected from the step (a) with a lithium compound solution which is basic in an aqueous solution for 1 hour or less and drying; and (c) annealing the active material washed from the step (b) with an addition of a lithium precursor to obtain a recovered active material, wherein the thermal treatment in the step (a) is performed at 300 to 650° C, wherein the recovered active material has a fluorine (F) content of 100 ppm or less, and wherein, during the thermal treatment in the step (a), the binder and the conductive material in the active material layer are thermally decomposed to produce $H_2O$ and $CO_2$ by reacting with oxygen in air.

2. The method according to claim 1, further comprising:

(d) surface-coating the active material annealed from the step (c).

3. The method according to claim 1, wherein the lithium compound solution contains a lithium compound in an amount of more than 0% and 15% or less.

4. The method according to claim 1, wherein the washing is performed by stirring the active material collected from the step (a) at the same time with immersing in the lithium compound solution.

5. The method according to claim 1, wherein the lithium precursor used in the annealing step (c) is one or more selected from the group consisting of LiOH, $Li_2CO_3$, $LiNO_3$ and $Li_2O$.

6. The method according to claim 1, wherein the lithium precursor is added in an amount for adding lithium at a ratio of lost lithium to a ratio between lithium and other metal in a raw active material used in the active material layer.

7. The method according to claim 1, wherein the lithium precursor is added in an amount corresponding to an amount of lithium at a molar ratio of 0.001 to 0.4 relative to an amount of lithium in the active material layer.

8. The method according to claim 7, wherein an additional lithium precursor is further added in an amount corresponding to an amount of lithium at a molar ratio of 0.0001 to 0.1 relative to an amount of lithium in the active material layer.

9. The method according to claim 1, wherein the annealing is performed in air at 400 to 1000° C.

10. The method according to claim 1, wherein a temperature of the annealing step exceeds a melting point of the lithium precursor.

11. The method according to claim 1, wherein the active material in the active material layer is collected in a form of powder, and carbon produced by carbonization of the binder or the conductive material does not remain on a surface of the powder.

12. The method according to claim 2, wherein the surface-coating step (d) includes coating at least one of a metal, an organic metal or a carbon material on a surface of the active material annealed from the step (c) by a solid or liquid phase process, and thermally treating at 100 to 1200° C.

13. The method according to claim 1, wherein the recovered active material is represented by the following Formula 1:

$$Li_aNi_xMn_yCO_2M_wO_{2+\delta} \quad \text{[Formula 1]}$$

where M comprises at least one selected from the group consisting of B, W, Al, Ti and Mg, $1<a\leq 1.1$, $0<x<0.95$, $0<y<0.8$, $0<z<1.0$, $0\leq w\leq 0.1$, $-0.02\leq\delta\leq 0.02$, $x+y+z+w=1$.

14. A method for recovering a positive electrode active material, comprising:

(a) thermally treating a positive electrode scrap comprising a lithium composite transition metal oxide positive electrode active material layer including nickel, cobalt and manganese on a current collector in air at 300 to 650° C, for thermal decomposition a binder and a conductive material in the active material layer to separate the current collector from the active material layer, and collecting an active material in the active material layer;

(b) washing the active material collected from the step (a) with a lithium compound solution which is basic in an aqueous solution, the lithium compound solution comprising a lithium compound in an amount of more than 0% and 15% or less for 1 hour or less, and drying; and (c) annealing the active material washed from the step (b) in air at 400 to 1000° C with an addition of at least one of LiOH, $Li_2CO_3$, $LiNO_3$ or $Li_2O$, wherein the recovered active material has a fluorine (F) content of 100 ppm or less, and wherein, during the thermal treatment in the step (a), the binder and the conductive material in the active material layer are thermally decomposed to produce $H_2O$ and $CO_2$ by reacting with oxygen in air.

15. The method according to claim 14, further comprising:

(d) surface-coating the active material annealed from the step (c) with at least one of a metal, an organic metal or a carbon material by a solid or liquid phase process and thermally treating at 100 to 1200° C.

16. The method according to claim 1, wherein the lithium precursor is added in an amount corresponding to an amount of lithium depleted during the steps (a) and (b).

* * * * *